US011724752B2

(12) United States Patent
Kiefer, IV et al.

(10) Patent No.: US 11,724,752 B2
(45) Date of Patent: Aug. 15, 2023

(54) SUPPORT OR STIFFENER FOR TRUCK BEDS AND THE LIKE

(71) Applicant: N.B. Adventures LLC, Wyomissing, PA (US)

(72) Inventors: William H. Kiefer, IV, Elizabethtown, PA (US); Nathan T. Sutherland, Wyomissing, PA (US)

(73) Assignee: N.B. ADVENTURES LLC, Wyomissing, PA (US)

( * ) Notice: Subject to any disclaimer, the term of this patent is extended or adjusted under 35 U.S.C. 154(b) by 91 days.

(21) Appl. No.: 17/376,636

(22) Filed: Jul. 15, 2021

(65) Prior Publication Data

US 2023/0016143 A1    Jan. 19, 2023

(51) Int. Cl.
*B62D 33/02*   (2006.01)
*B62D 33/023*  (2006.01)
*B62D 25/20*   (2006.01)

(52) U.S. Cl.
CPC ....... *B62D 33/0222* (2013.01); *B62D 33/023* (2013.01); *B62D 25/2054* (2013.01)

(58) Field of Classification Search
CPC .. B62D 33/02; B62D 33/023; B62D 33/0222; B62D 33/046; B62D 33/048; B62D 27/02; B62D 27/023; B62D 25/2054
USPC ........................ 296/30, 183.1, 191
See application file for complete search history.

(56) References Cited

U.S. PATENT DOCUMENTS

| | | | | |
|---|---|---|---|---|
| 717,687 | A * | 1/1903 | Johnson ................. | B62D 25/04 296/30 |
| 761,816 | A * | 6/1904 | Brunsman .............. | B62D 25/04 52/657 |
| 1,232,963 | A * | 7/1917 | Parkins .................. | B62D 25/04 296/30 |
| 1,339,521 | A * | 5/1920 | Mayer .................... | B62D 27/02 296/30 |
| 1,636,412 | A * | 7/1927 | Gallowitz ............... | F16B 12/50 410/71 |
| 9,126,630 | B1 * | 9/2015 | Gallagher ............ | B62D 27/023 |
| 10,343,727 | B1 * | 7/2019 | Hihara .................. | B62D 33/023 |
| 2021/0300482 | A1 * | 9/2021 | Mooney ............... | B62D 33/037 |

* cited by examiner

*Primary Examiner* — Joseph D. Pape
*Assistant Examiner* — Veronica M Shull
(74) *Attorney, Agent, or Firm* — WHDA, LLP

(57) ABSTRACT

According to some illustrative embodiments, a novel vehicle bed support or stiffener is provided. In the preferred embodiments, the vehicle bed support or stiffener is uniquely configured such that the structure does not obstruct or encroach the vehicle bed region of a vehicle. In some preferred embodiments, the vehicle bed support or stiffener is fixed to a vehicle bed with an upwardly extending front support and stiffening wall extending laterally along an end of said floor and downwardly below a plane of the floor and extending laterally along an end of at least one of said left and right side walls and outwardly away from the vehicle bed.

20 Claims, 5 Drawing Sheets

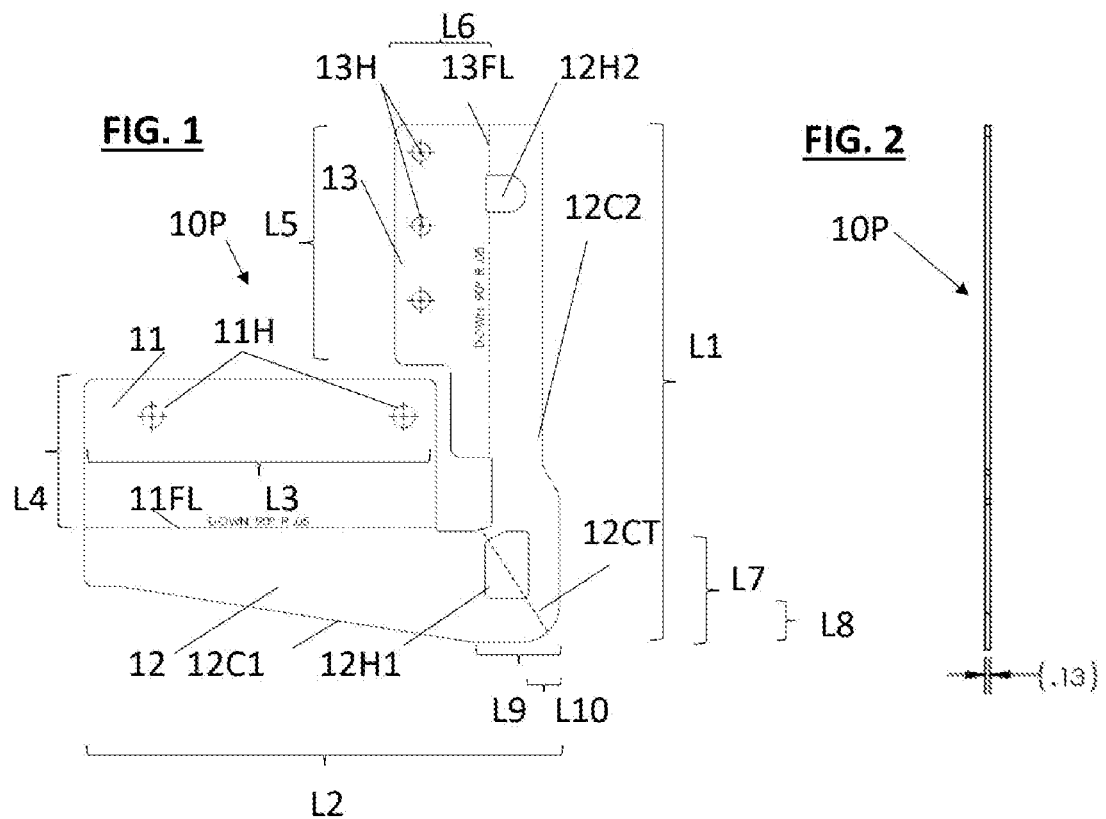
FIG. 1
FIG. 2
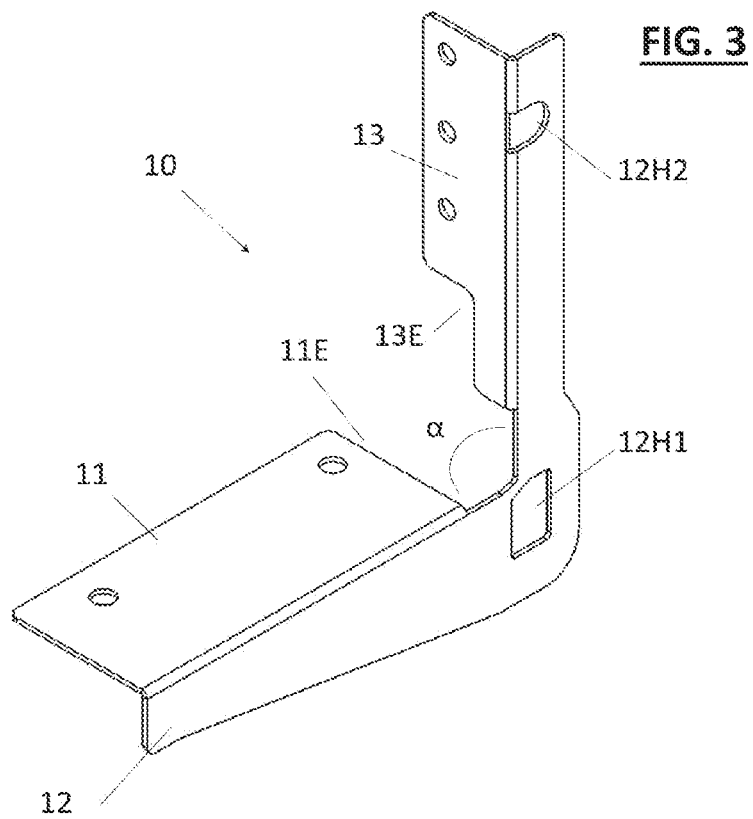
FIG. 3

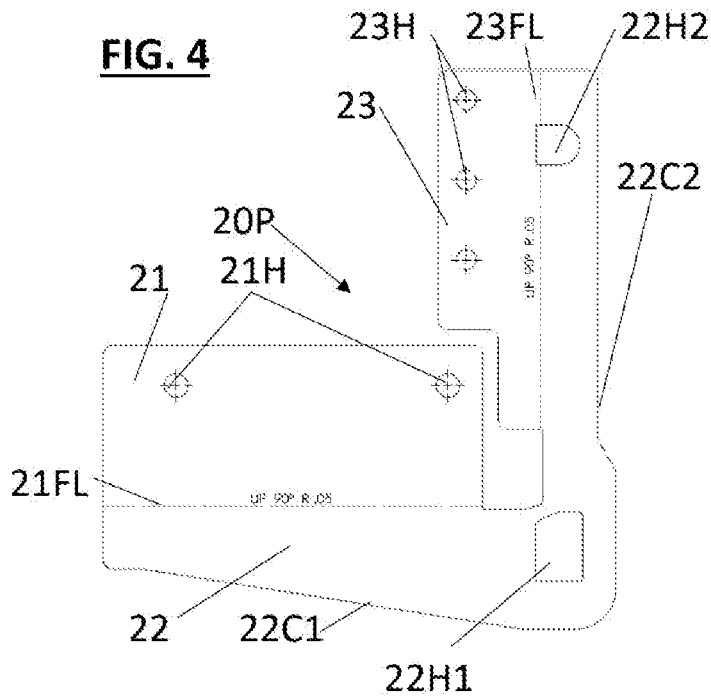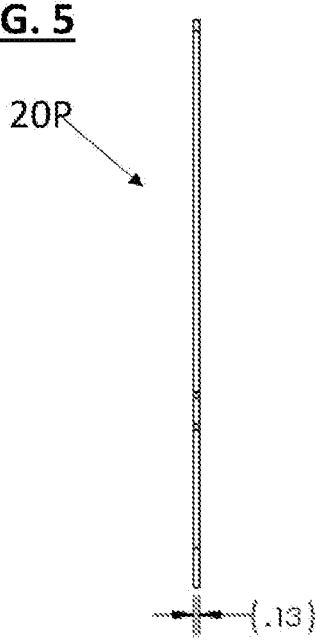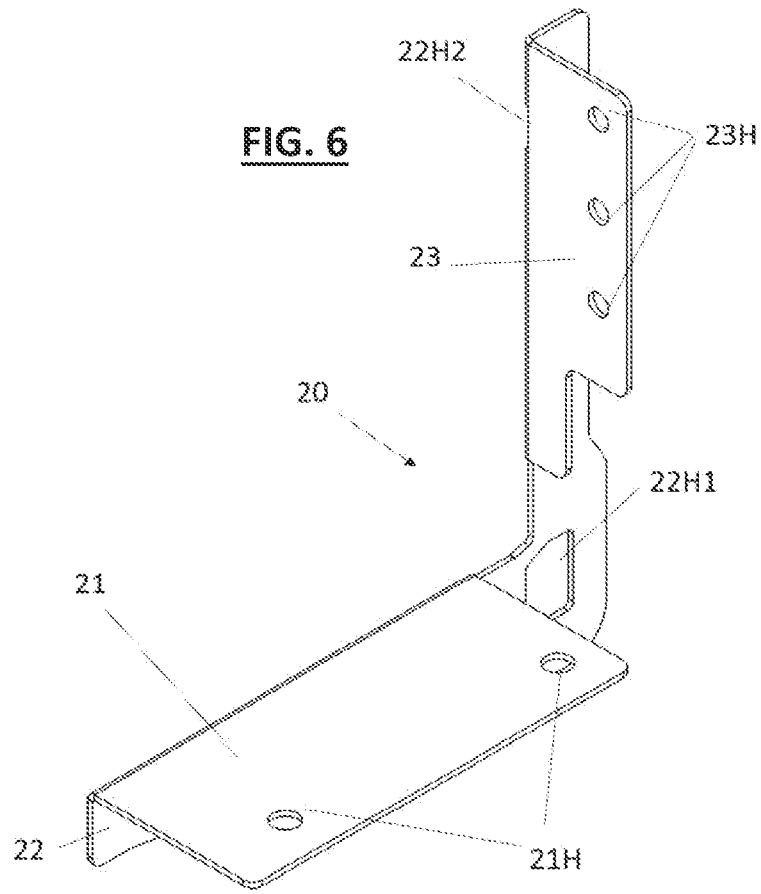

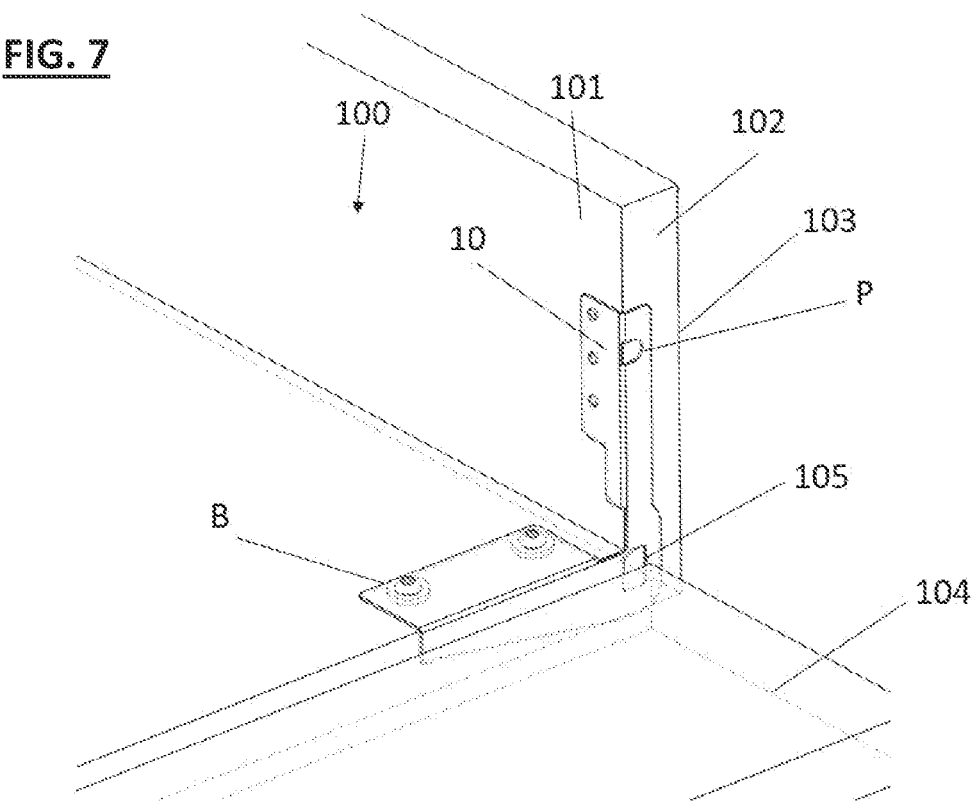
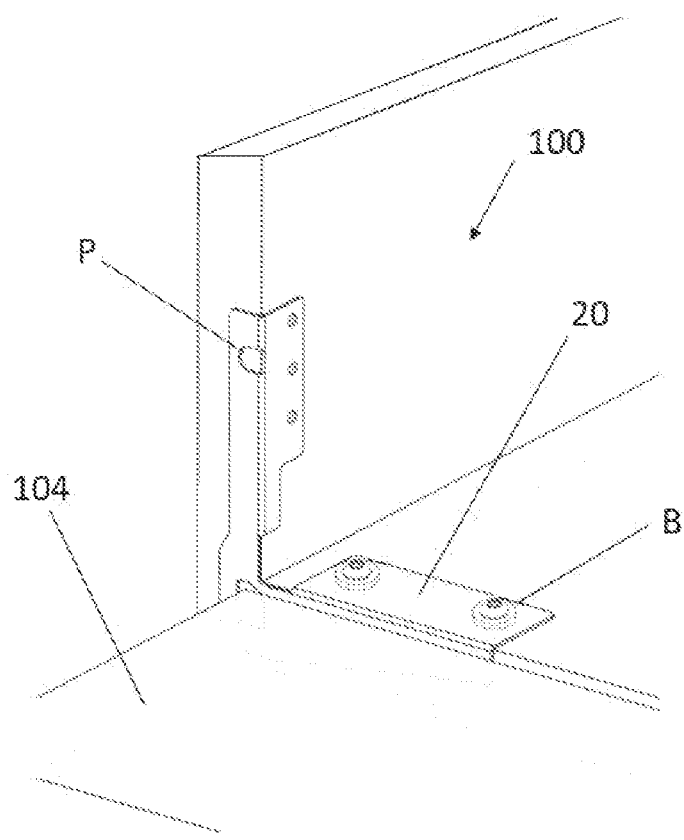

SUPPORT OR STIFFENER FOR TRUCK BEDS AND THE LIKE

BACKGROUND

The present invention relates to systems and methods for supporting and/or stiffening of vehicle beds, and the preferred embodiments relate to systems and methods for supporting and/or stiffening truck beds and the like.

With reference to FIG. 10, FIG. 10 shows an existing vehicle bed stiffener 100 mounted in a vehicle bed. Among other things, the vehicle bed stiffener shown in FIG. 10 has drawbacks because the stiffening wall 112 extends inwardly into the region of the vehicle bed both from the perimeter wall of the vehicle bed and from the floor of the vehicle bed. Accordingly, the existing vehicle bed stiffener 100 substantially impedes use of the vehicle bed—e.g., such as impeding sliding of items over the vehicle bed floor or sliding of items along the vehicle bed wall and otherwise interferes with freedom of use of the interior of the vehicle bed. Moreover, the manner in which the stiffening wall 112 projects inwardly from the floor and the perimeter wall of the vehicle bed results in a thin projecting member (i.e., corresponding to the width of the stiffening wall 112) that can result in a) damage to objects and/or injury to humans or animals upon contact therewith and/or b) damage to the vehicle bed stiffener 100 upon contact with external objects within the vehicle bed.

The preferred embodiments of the present invention overcome shortcomings of the above and/or other background art.

SUMMARY

As indicated above, the preferred embodiments overcome shortcomings in the above and/or other background art.

In some preferred embodiments, a vehicle bed support and/or stiffener is configured in a manner such as to avoid significantly extending or projecting inwardly into the region of the vehicle bed from the perimeter wall of the vehicle bed and/or from the floor of the vehicle bed. Among other things, the preferred embodiments of the present invention can help, e.g., to avoid a) damage to objects and/or injury to humans or animals and/or b) damage to the vehicle bed stiffener upon contact with external objects within the vehicle bed.

According to some embodiments, a vehicle bed support or stiffener assembly is provided that includes: at least one vehicle bed support or stiffener having an upwardly extending front support or stiffening wall portion, a rearwardly extending floor-attaching wall portion, and a rearwardly extending perimeter-side-wall-attaching wall portion, wherein the upwardly extending front support or stiffening wall portion extends substantially along a first plane and the rearwardly extending perimeter-side-wall attaching portion extends substantially along a second plane, wherein the first plane and the second plane form an angle α that is between about 75 to 105 degrees, and wherein the upwardly extending front support or stiffening wall portion extends external to a region within the angle α such as to avoid obstruction of a vehicle bed region.

In some preferred embodiments, the upwardly extending front support or stiffening wall portion does not extend internal within a region of the angle α so as not to obstruct the vehicle bed region.

In some preferred embodiments, the at least one vehicle bed support or stiffener includes a right-side vehicle bed support or stiffener and a left-side vehicle bed support or stiffener.

In some preferred embodiments, the at least one vehicle bed support or stiffener is made of metal. In some preferred embodiments, each the at least one vehicle bed support or stiffener is made from a single bent sheet of metal. In some preferred embodiments, the at least one vehicle bed support or stiffener is made of stainless steel.

In some preferred embodiments, each the at least one vehicle bed support or stiffener has a height of between about 8 to 20 inches, or, in some embodiments, a height of between about 10 to 18 inches.

In some preferred embodiments, each the at least one vehicle bed support or stiffener is made with a metal plate having a thickness of between about 0.085 to 0.25 inches.

In some preferred embodiments, the assembly further includes: a vehicle bed having a floor and left, and right side walls extending upwardly at left and right sides of the floor; the at least one vehicle bed support or stiffener including a left-side vehicle bed support or stiffener and a right-side vehicle bed support or stiffener; wherein the upwardly extending front support or stiffening wall portion of each of the left-side vehicle bed support or stiffener and the right-side vehicle bed support or stiffener extends laterally outside of an end the floor and laterally outside of and end of a respective one of the left and right side walls.

In some preferred embodiments, the at least one vehicle bed support or stiffener extends flush along the floor to avoid obstruction over the vehicle bed.

In some preferred embodiments, the at least one vehicle bed support or stiffener extends flush along at least one of the left and right side walls to avoid obstruction over the vehicle bed.

In some preferred embodiments, the at least one vehicle bed support or stiffener extends inwardly from a perimeter side wall of the vehicle bed a distance of less than about ½ inch, or, in some preferred embodiments, a distance of less than about ⅓ inch, or, in some preferred embodiments, a distance of less than about ¼ inch.

In some preferred embodiments, the at least one vehicle bed support or stiffener extends upwardly from a floor of the vehicle bed a distance of less than about ½ inch, or, in some preferred embodiments, a distance of less than about ⅓ inch, or, in some preferred embodiments, a distance of less than about ¼ inch.

According to some embodiments, a method of using any of the above vehicle bed support or stiffener assembly embodiments is provided that includes:

fixing the vehicle bed support or stiffener to a vehicle bed, with the upwardly extending front support and stiffening wall being extending laterally along an end of the floor and downwardly below a plane of the floor and extending laterally along an end of one of the left and right side walls and outwardly away from the vehicle bed.

According to some other embodiments of the invention, a method of supporting or stiffening a vehicle bed is provided that includes: a) providing a vehicle having a vehicle bed with a floor and left and right side walls extending upwardly at left and right sides of the floor; b) providing a vehicle bed support or stiffener having an upwardly extending front support and stiffening wall portion; c) fixing the vehicle bed support or stiffener to the vehicle bed, with the upwardly extending front support and stiffening wall extending laterally along an end of the floor and downwardly below a plane of the floor and extending laterally along an end of one of the left and right side walls and outwardly away from the vehicle bed.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF DRAWINGS

The preferred embodiments of the present invention are shown by a way of example, and not limitation, in the accompanying figures, in which:

FIG. 1 is a front plan view of a right-side vehicle bed plate member according to some embodiments of the invention;

FIG. 2 is a side view of the right-side vehicle bed support and stiffener plate shown in FIG. 1, from a right side of the FIG. 1;

FIG. 3 is a perspective front view of a right-side vehicle bed support and stiffener formed from the right-side vehicle bed support and stiffener plate shown in FIG. 1;

FIG. 4 is a front plan view of a left-side vehicle bed support and stiffener plate member according to some embodiments of the invention;

FIG. 5 is a side view of the left-side vehicle bed support and stiffener plate shown in FIG. 4, from a right side of the FIG. 4;

FIG. 6 is a perspective front view of a left-side vehicle bed support and stiffener formed from the left-side vehicle bed support and stiffener plate shown in FIG. 4;

FIG. 7 is a perspective front view of the right-side vehicle bed support and stiffener shown in FIG. 3 as mounted in a supporting and stiffening position at a right side of a vehicle bed;

FIG. 8 is a perspective front view of the left-side vehicle bed support and stiffener shown in FIG. 6 as mounted in a supporting and stiffening position at a left side of a vehicle bed;

DETAILED DESCRIPTION OF THE PREFERRED EMBODIMENTS OF THE INVENTION

Figure 9:
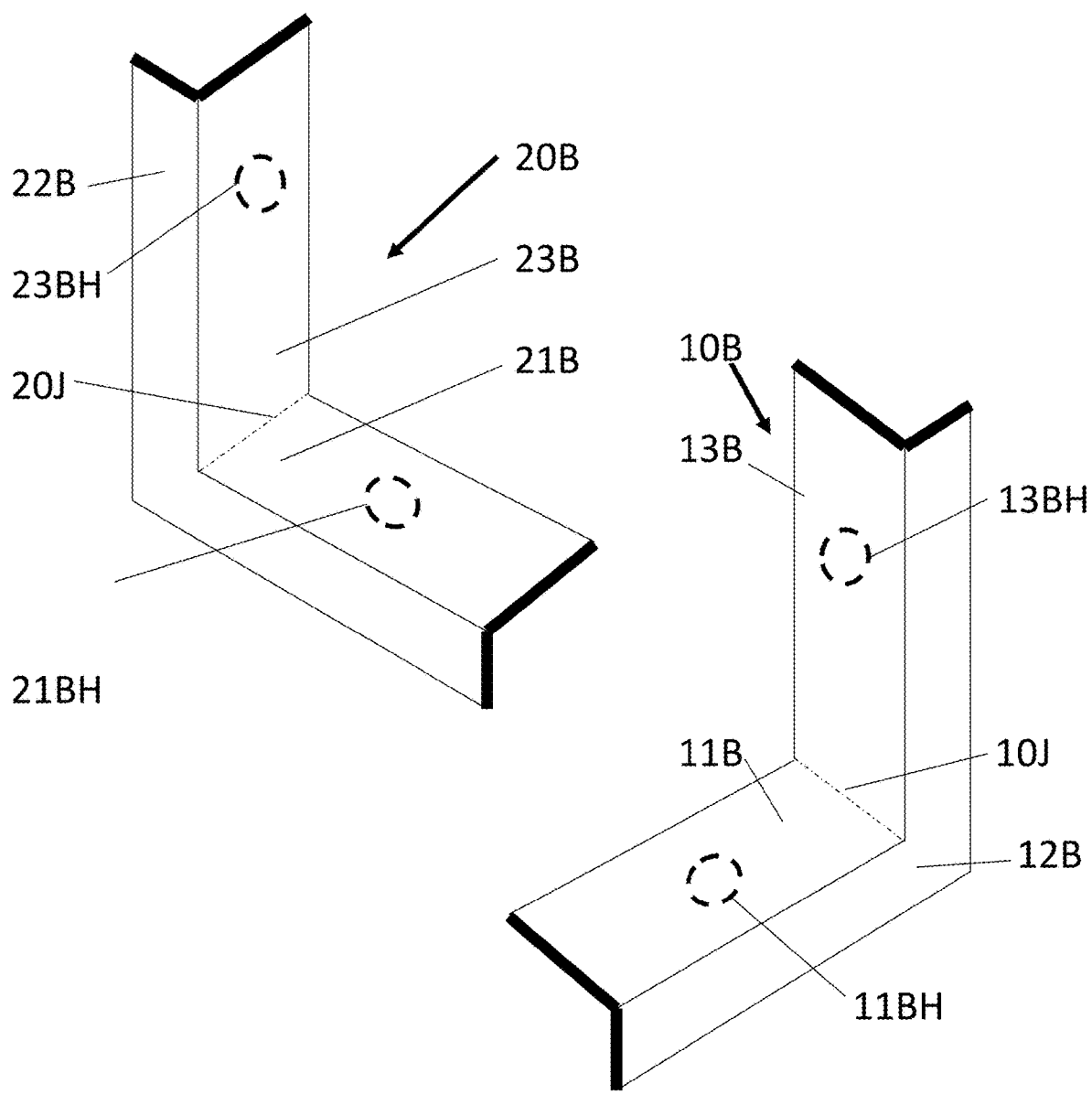
FIG. 9 is a perspective front view of a pair of vehicle bed support and stiffeners according to alternative embodiments of the invention.

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Illustrative Sizes, Dimensions & Scale in Some Embodiments

Although sizes and dimensions of the preferred embodiments can be varied as desired in various embodiments and implementations of the present invention, in some embodiments, the attached figures show illustrative embodiments with the elements illustrated to scale in size and dimensions.

The Preferred Embodiments

The preferred embodiments provide a novel and advantageous vehicle bed support and stiffener that overcomes drawbacks of background devices. In the preferred embodiments, a vehicle bed support and/or stiffener is configured in a manner such as to avoid significantly extending or projecting inwardly into the region of the vehicle bed from the perimeter wall of the vehicle bed and/or from the floor of the vehicle bed. Among other things, the preferred embodiments of the present invention can help, e.g., to avoid a) damage to objects and/or injury to humans or animals and/or b) damage to the vehicle bed stiffener upon contact with external objects within the vehicle bed.

In the preferred embodiments, the vehicle bed support and stiffening structure is provided as an after-market accessory that is added to a vehicle by an user of the vehicle. In the preferred embodiments, the user can remove and/or replace the vehicle bed support and stiffening structure as desired.

In the preferred embodiments, the vehicle bed support and stiffening structure can enhance the support and stability of the vehicle bed. For example, the support and stiffening structure can enhance the strength and rigidity of the perimeter walls of the vehicle bed. As another example, the support and stiffening structure can enhance the strength and rigidity of the floor of the vehicle bed. In some embodiments, the vehicle bed support and stiffening structure is advantageous for off-road use of the vehicle, for carrying of loads within the vehicle bed of the vehicle, for enhancing strength and rigidity of the vehicle bed, and/or for reducing vibration, wobbling, or other movement of the vehicle bed.

FIG. 1 is a front plan view of a right-side vehicle bed support and stiffener plate member 10P according to some embodiments of the invention. In this illustrative embodiment, the plate member 10P shown in FIG. 1 is bent around fold lines 11FL and 13FL to form the right-side vehicle bed support and stiffener 10 shown in FIG. 3.

As shown in FIGS. 3 and 7, the right-side vehicle bed support and stiffener 10 includes an upwardly extending front support and stiffening wall portion 12, a rearwardly extending floor-attaching wall portion 11, and a rearwardly extending perimeter-side-wall-attaching wall portion 13.

As also shown in FIGS. 3 and 7, in the preferred embodiments, the front support and stiffening wall portion 12 extends transversely to the rearwardly extending floor-attaching wall portion 11. For example, in some preferred embodiments, the upwardly extending front support and stiffening wall portion 12 extends on a plane at an angle of about 90 degrees with respect to a plane on which the rearwardly extending floor-attaching wall portion 11 extends. In some other examples, this latter angle can be greater than or less than 90 degrees, such as, e.g., in some embodiments between about 60 to 120 degrees, or, in some most preferred embodiments, between about 80 to 100 degrees.

As also shown in FIGS. 3 and 7, in the preferred embodiments, the front support and stiffening wall portion 12 extends transversely to the rearwardly extending perimeterside-wall-attaching wall portion 13. For example, in some preferred embodiments, the upwardly extending front support and stiffening wall portion 12 extends on a plane at an angle of about 90 degrees with respect to a plane on which the perimeter-side-wall-attaching wall portion 13. In some other examples, this latter angle can be greater than or less than 90 degrees, such as, e.g., in some embodiments between about 60 to 120 degrees, or, in some embodiments between about 75 to 105 degrees, or, in some most preferred embodiments, between about 80 to 100 degrees.

As also shown in FIGS. 3 and 7, in the preferred embodiments, the rearwardly extending perimeter-side-wall-attaching wall portion 13 preferably extends on a plane that is transverse to a plane of the rearwardly extending floor-attaching wall portion 11. In some preferred embodiments, the angle α (shown in FIG. 3) is about 90 degrees. In some other examples, this latter angle α can be greater than or less than 90 degrees, such as, e.g., in some embodiments between about 60 to 120 degrees, or, in some embodiments between about 75 to 105 degrees, or, in some most preferred embodiments, between about 80 to 100 degrees.

In the preferred embodiments, the right-side vehicle bed support and stiffener 10 extends only minimally within the bed region of the vehicle. In some preferred embodiments, the right-side vehicle bed support and stiffener 10 extends inwardly from the perimeter side wall of the vehicle bed a distance corresponding to a thickness of the rearwardly extending perimeter-side-wall-attaching wall portion 13. In some preferred embodiments, the right-side vehicle bed support and stiffener 10 extends upwardly from the floor of the vehicle bed a distance corresponding to a thickness of the rearwardly extending floor-attaching wall portion 11.

For example, in some preferred embodiments, the perimeter-side-wall-attaching wall portion 13 extends substantially flush along a surface of the perimeter side wall of the vehicle bed. In some preferred embodiments, the perimeter side wall of the vehicle bed is substantially vertical and flat and the perimeter-side-wall-attaching wall portion 13 extends flush alongside the perimeter side wall.

In some preferred embodiments, the thickness of the plate 10P (and, hence, the thickness of the perimeter-side-wall-attaching wall portion 13 and the thickness of the rearwardly extending floor-attaching wall portion 11) is, as shown in FIG. 2, about $1/8^{th}$ inch (i.e., about 0.125 inches). In some embodiments, the thickness of the plate 10P is between about 0.065 to 0.35 inches. In some embodiments, the thickness of the plate 10P is between about 0.085 to 0.25 inches. In some embodiments, the thickness of the plate 10P is between about 0.09 to 0.20 inches. In some embodiments, the thickness of the plate 10P is between about 0.10 to 0.15 inches.

In some preferred embodiments, the right-side vehicle bed support and stiffener 10 extends inwardly from the perimeter side wall of the vehicle bed a distance of less than about ½ inch, or, more preferably, a distance of less than about ⅓ inch, or, more preferably, a distance of less than about ¼ inch, or, more preferably, a distance of about ⅛ inch.

Additionally, in some preferred embodiments, the right-side vehicle bed support and stiffener 10 extends upwardly from the floor of the vehicle bed a distance of less than about ½ inch, or, more preferably, a distance of less than about ⅓ inch, or, more preferably, a distance of less than about ¼ inch, or, more preferably, a distance of about ⅛ inch.

As shown in, e.g., FIGS. 3 and 7, in the preferred embodiments, the front support and stiffening wall portion 12 extends from outwardly from the rearwardly extending perimeter-side-wall-attaching wall portion 13 and downwardly from the rearwardly extending floor-attaching wall portion 11. As a result, in the preferred embodiments, a substantial portion of the front support and stiffening wall portion 12 extends entirely laterally outside of the inside edge of the perimeter side wall of the vehicle bed. In addition, in the preferred embodiments, a substantial portion of the front support and stiffening wall portion 12 extends entirely below a floor surface of the floor of the vehicle bed. In this manner, the right-side vehicle bed support and stiffener 10 is capable of providing support and/or stiffening of the vehicle bed without obstruction and/or other problems of the background art.

As shown in FIG. 7, in the preferred embodiments, front support and stiffening wall portion 12, is preferably configured to extend flush upon a rearwardly facing wall 102 of the vehicle bed 100. For example, as shown in FIG. 7, in some preferred embodiments, a vehicle bed 100 includes a generally vertical and flat outer perimeter wall 101, a rearwardly facing wall portion 102 extending transversely to the flat outer perimeter wall 101, and a generally vertical and flat outer perimeter wall portion 103 extending from an outer edge of the rearwardly facing wall portion 102. In this manner, during use, a vehicle tailgate 104 (e.g., a rear wall of the vehicle bed) can be pivoted upwardly from an open state as shown in FIG. 7 to a generally vertical position closing the vehicle bed in which the tailgate 104 is raised to a position in which the upper surface of the tailgate shown in FIG. 7 is raised such as to be adjacent and substantially parallel to the front support and stiffening wall portion 12.

Although some preferred embodiments of the present invention include such a uniquely arranged front support and stiffening wall portion 12, which extends laterally outwardly along, e.g., a narrow rearwardly facing wall portion 102 and which extends downwardly below the floor of the vehicle bed, it is notable that existing vehicle beds do not readily accommodate such a structure. For example, a tailgate 104 often includes structure that encroaches the region to be occupied by the front support and stiffening wall portion 12 that extends below the floor of the vehicle bed. As another example, a wall portion 102 can be narrow, irregularly shaped and can include regions with functional elements that require exposure.

Accordingly, in some preferred embodiments, the front support and stiffening wall portion 12 is adapted to fit with a particular vehicle bed structure of a particular vehicle. Towards that end, the front support and stiffening wall portion 12 preferably includes an outer perimeter side edge 12C2 that is configured so as to extend to the outer contour of the wall portion 102. Additionally, in some embodiments, the front support and stiffening wall portion 12 can include a lower edge 12C1 that is configured to fit within an available region below the level of the floor of the vehicle bed. In some preferred embodiments, the lower edge 12C1 is angled such that the front support and stiffening wall portion 12 has a greater depth below the floor of the vehicle bed at the corner region proximate the angle α and a shallower depth proximate the innermost end (e.g., at the left side of the view shown in, e.g., FIG. 1 or 3). Among other things, a greater depth proximate the angle α more substantially enhances the support and stiffening qualities offered by the vehicle bed stiffener.

Additionally, in some preferred embodiments, the front support and stiffening wall portion 12 includes one or more through-holes or cutouts (e.g., two shown in the illustrated embodiment) to accommodate one or more of a) structure of the tailgate 104 that encroaches a region of the front support and stiffening wall portion 12 and b) functional elements on a rear of the vehicle bed (such as, e.g., functional elements on the wall portion 102). By way of example, as shown in FIGS. 1, 3 and 7, in some embodiments, the front support and stiffening wall portion includes at least one through hole 12H2 that is arranged to enable a bolt, a bolt head, or a flexible member, or other projection, to extend therethrough. As another example, as also shown in FIGS. 1, 3 and 7, in some embodiments, the front support and stiffening wall portion includes at least one through hole 12H1 which is adapted to receive a moving element 105 (see FIG. 7) attached to the tailgate 104.

Although the illustrated embodiment includes a through hole 12H1 in a region proximate the angle α, which is subject to higher loads during use, in the preferred embodiments, the front support and stiffening wall portion 12 includes an extended region surrounding the through hole 12H1, such that along the region of the wall portion 12 delineated along the dashed line 12CT, enhanced rigidity is achieved. For example, in some preferred embodiments, the % occupied by the through hole 12H1 along the line 12CT is preferably less than 75%, or, more preferably, less than 65%, or, more preferably, less than 60%, or, more preferably, less than 55%, or, more preferably, about 50% or less of the length of the line 12CT. Moreover, in some preferred embodiments, such as, e.g., in the embodiment shown in, e.g., FIGS. 1 and 3, the corner region of the front support and stiffening wall portion 12 along the line 12CT, preferably includes a region interior to the through hole 12H1 (i.e., adjacent the angle α) and a region exterior to the through hole (i.e., extending to a lower right corner, as shown in, e.g., FIG. 1, along the line 12CT).

As also shown in FIGS. 1, 3 and 7, in the preferred embodiments, the rearwardly extending perimeter-side-wall-attaching wall portion 13 and the rearwardly extending floor-attaching wall portion 11 both include one or more through holes for receiving bolts, screws or the like for fixing the right-side vehicle bed support and stiffener 10 to the vehicle bed. For example, in some illustrative embodiments, the rearwardly extending floor-attaching wall portion 11 includes two through holes 11H as shown in the figures and the rearwardly extending perimeter-side-wall-attaching wall portion 13 includes three through holes 13H for accommodating bolts B, projections P, screws or the like for mounting to the vehicle bed as shown in, e.g., FIG. 7. Although two through holes 11H and three through holes 13H are shown in the illustrated example, it should be appreciated that various other numbers of through holes 11H and/or 13H can be employed in various other embodiments, such as, e.g., any number up to about 6 or even more through holes 11H and/or 13H can be provided in various embodiments. In some of the preferred embodiments, the through holes 11H and 13H are specifically located in relation to bolt or screw receiving holes located within the floor of the vehicle bed and/or within the flat outer perimeter wall 101 of the vehicle bed. Accordingly, in some preferred embodiments, the right-side vehicle bed support and stiffener 10 is specially adapted for easy mounting to a particular vehicle having a particular vehicle bed structure.

In the embodiment shown in FIGS. 1-3 and 7, both of the rearwardly extending perimeter-side-wall-attaching wall portion 13 and the rearwardly extending floor-attaching wall portion 11 are connected to the front support and stiffening wall portion 12, but are separated from one another. For example, as shown in FIG. 3, the rearwardly extending perimeter-side-wall-attaching wall portion 13 includes an edge 13E that is offset from and does not extend to the center of the angle α, and the rearwardly extending floor-attaching wall portion 11 includes an edge 11E that is offset from and does not extend to the center of the angle α. However, in some alternative embodiments, the edges 11E and 13E can be extended to the center of the angle α in order to contact one another. In some embodiments, the front support and stiffening wall portion 12 can be formed from a single sheet or plate of metal similar to that shown in FIG. 1, then the wall portions 11 and 13 can be bent, and then the wall portions 11 and 13 can be welded or otherwise fixed together (i.e., in embodiments in which the wall portions 11 and 13 extend to one another in contrast to that shown in FIGS. 1 and 3).

Although some preferred embodiments of the invention include formation of the right-side vehicle bed support and stiffener 10 from a single plate or single sheet that is bent as discussed above, in other embodiments, the right-side vehicle bed support and stiffener 10 can be formed by molding into a final use shape, such as, e.g., into a shape as shown in FIG. 3. Similarly, in embodiments in which the wall portions 11 and 13 are connected together, such a right-side vehicle bed support and stiffener 10 can readily be formed by molding.

In the most preferred embodiments, the right-side vehicle bed support and stiffener 10 is made of metal, such as, e.g., aluminum, copper, brace, stainless steel, or other suitable metals. In the most preferred embodiments, the right-side vehicle bed support and stiffener 10 is made with stainless steel. However, in various other embodiments, the right-side vehicle bed stiffener 10 can be made with other materials, such as, e.g., plastics, composite materials, and/or other suitable materials.

In some illustrative embodiments, the right-side vehicle bed support and stiffener 10 has a height L1 (shown in FIG. 1) of between about 8 to 20 inches, or, in some preferred embodiments, of between about 10 to 18 inches, or, in some preferred embodiments, of between about 12 to 16 inches, or, in some preferred embodiments of between about 13 to 15 inches. In some illustrative preferred embodiments, the height L1 is about 14 inches.

In some illustrative embodiments, the right-side vehicle bed support and stiffener 10 has a length L2 (shown in FIG. 1) of between about 7 to 19 inches, or, in some preferred embodiments, of between about 9 to 17 inches, or, in some preferred embodiments, of between about 11 to 15 inches, or, in some preferred embodiments of between about 12 to 14 inches. In some illustrative preferred embodiments, the height L1 is about 13.8 inches. As indicated above, in some preferred embodiments, the right-side vehicle bed support and stiffener 10 is formed as shown in the figures, with the relative sizes and dimensions being to scale as shown. Accordingly, it should be appreciated that all other dimensions of the right-side vehicle bed support and stiffener 10 in various embodiments can range a similar extent, to scale, based on the above-noted ranges of values of lengths L1 and L2 in various embodiments of the invention.

In some illustrative embodiments, the right-side vehicle bed support and stiffener 10 has a length L3 (i.e., a length of the element 11 shown in FIG. 1) of between about 5.5 to 14.5 inches, or, in some preferred embodiments, of between about 7.5 to 12.5 inches, or, in some preferred embodiments, of between about 8.5 to 10.5 inches. In some illustrative preferred embodiments, the length L3 is about 9.5 inches.

In some illustrative embodiments, the right-side vehicle bed support and stiffener 10 has a length L4 (i.e., a width of the element 11 shown in FIG. 1) of between about 2.0 to 7.0 inches, or, in some preferred embodiments, of between about 3.0 to 6.0 inches, or, in some preferred embodiments, of between about 3.5 to 4.5 inches. In some illustrative preferred embodiments, the length L3 is about 4 inches.

In some illustrative embodiments, the right-side vehicle bed support and stiffener 10 has a length L5 (i.e., a length of the element 13 shown in FIG. 1) of between about 4 to 9 inches, or, in some preferred embodiments, of between about 5 to 8 inches, or, in some preferred embodiments, of between about 6 to 7 inches. In some illustrative preferred embodiments, the length L5 is about 6.5 inches.

In some illustrative embodiments, the right-side vehicle bed support and stiffener 10 has a length L6 (i.e., a width of the element 13 shown in FIG. 1) of between about 1.5 to 4.0 inches, or, in some preferred embodiments, of between about 2.0 to 3.0 inches. In some illustrative preferred embodiments, the length L6 is about 2.5 inches.

In some illustrative embodiments, the right-side vehicle bed support and stiffener 10 has a length L7 (i.e., a height of the element 12 in the region of the corner proximate the angle α shown in FIG. 1) that is between about of between about 1.5 to 4.5 inches, or, in some preferred embodiments, of between about 2.0 to 4.0 inches, or, in some preferred embodiments, of between about 2.5 to 3.5 inches. In some illustrative preferred embodiments, the length L7 is about 3 inches.

In some illustrative embodiments, the right-side vehicle bed support and stiffener 10 has a length L8 (i.e., a height of the element 12 below the through hole 12H1 in the region of the corner proximate the angle α shown in FIG. 1) that is between about of between about 0.5 to 1.75 inches, or, in some preferred embodiments, of between about 0.75 to 1.55 inches, or, in some preferred embodiments, of between about 1.0 to 1.35 inches. In some illustrative preferred embodiments, the length L8 is about 1.2 inches.

In some illustrative embodiments, the right-side vehicle bed support and stiffener 10 has a length L9 (i.e., a width of the element 12 in the region of the corner proximate the angle α shown in FIG. 1) that is between about of between about 1 to 3 inches, or, in some preferred embodiments, of between about 1.4 to 2.5 inches, or, in some preferred embodiments, of between about 1.5 to 2.0 inches. In some illustrative preferred embodiments, the length L7 is about 1.8 inches.

In some illustrative embodiments, the right-side vehicle bed support and stiffener 10 has a length L10 (i.e., a width of the element 12 below the through hole 12H1 in the region of the corner proximate the angle α shown in FIG. 1) that is between about of between about 0.5 to 1.25 inches, or, in some preferred embodiments, of between about 0.7 to 1.0 inches, or, in some preferred embodiments, of between about 0.75 to 0.95 inches. In some illustrative preferred embodiments, the length L10 is about 0.8 inches.

Although FIGS. 1-3 and 7 depict a right-side vehicle bed stiffener 10, in the preferred embodiments two bed stiffeners are provided, including bed stiffeners at the right-side and the left side of the vehicle bed. Accordingly, in some preferred embodiments, a set of two bed stiffeners is provided that also includes a similarly constructed left-side vehicle bed stiffener 20, as shown in, e.g., FIGS. 4-6 and 8. Towards that end, the left-side vehicle bed stiffener 20 can be configured the same as the right-side vehicle bed stiffener 10, with modifications to fit on the opposite side (i.e., the left side) of the vehicle bed.

Similar to FIG. 1, FIG. 4 is a front plan view of a left-side vehicle bed support and stiffener plate member 20P according to some embodiments of the invention. In this illustrative embodiment, the plate member 20P shown in FIG. 1 is bent around fold lines 21FL and 23FL to form the left-side vehicle bed support and stiffener 20 shown in FIG. 6. As shown in FIGS. 6 and 8, the left-side vehicle bed support and stiffener 20 includes an upwardly extending front support and stiffening wall portion 22, a rearwardly extending floor-attaching wall portion 21, and a rearwardly extending perimeter-side-wall-attaching wall portion 23.

As with the right-side vehicle bed support and stiffener 10, the left-side vehicle bed support and stiffener 20 preferably includes through holes 23H, through holes 21H, and through holes 22H1 and 22H2. Moreover, the left-side vehicle bed support and stiffener also preferably is formed from a plate member 20P (shown in FIG. 4), which is folded at fold lines 21FL and 23FL to create the left-side vehicle bed support and stiffener 20 as shown in FIG. 6.

In the preferred embodiments, the left-side vehicle bed support and stiffener 20 is made the same or substantially the same as the right-side vehicle bed support and stiffener 10, or, rather, as a mirror image thereof for mounting to the opposite side of the vehicle bed. Accordingly, in various embodiments, all structures, sizes, materials and other features of the right-side vehicle bed support and stiffener 10 can be implemented in various embodiments of the left-side vehicle bed support and stiffener 20. In the embodiments of the left-side vehicle bed support and stiffener 20 shown in FIGS. 4-6 and 8, the various elements are parallel can be formed the same as like elements of the right-side vehicle bed support and stiffener 10 shown in FIGS. 1-3 and 7. Towards that end, the elements shown in FIGS. 1-3 and 7 correspond to like elements in FIGS. 4-6 and 8, with the elements in FIGS. 1-3 and 7 being within the ten's (i.e., numbers within the teens) and the elements in FIGS. 4-6 and 8 being within the twenty's (i.e., numbers within the twenties), with like elements in FIGS. 4-6 and 8 being parallel to like elements in FIGS. 1-3 and 7, but with an increase by 10—such that, for example, elements 10, 10P, 11, 11H, 12, 12C1, 12C2, 13, 13H, 12H1, 12H2, 11FL, 13FL are like elements 20, 20P, 21, 21H, 22, 22C1, 22C2, 23, 23H, 22H1, 22H2, 21FL, 23FL.

Furthermore, FIG. 4 is a front plan view of a left-side vehicle bed support and stiffener plate member 20P according to some embodiments of the invention. Although the plate member 20P shown in FIG. 4 is similar to that shown in FIG. 1, in the preferred embodiments, the member 10 is formed by bending around fold lines 11FL and 13FL in an opposite direction from the direction in which the member 20 is formed by bending around the fold lines 21FL and 23FL.

FIG. 5 is a side view of the left-side vehicle bed support and stiffener plate 20P shown in FIG. 4, from a right side of the FIG. 4. In addition, FIG. 6 is a perspective front view of a left-side vehicle bed support and stiffener 20 formed from the left-side vehicle bed support and stiffener plate 20P shown in FIG. 4. Additionally, FIG. 8 is a perspective front view of the left-side vehicle bed support and stiffener 20 shown in FIG. 6 as mounted in a supporting and stiffening position at a left side of a vehicle bed.

Although FIGS. 1-8 show some most preferred embodiments of the invention, in various other embodiments, a vehicle bed support and stiffening assembly can be provided that is modified from that shown in FIGS. 1-8. For example, in some embodiments, the wall portions 11 and 13 and/or 21 and 23 can be connected together (as discussed above).

By way of example, FIG. 9 is a perspective front view of a pair of vehicle bed support and stiffeners 10B and 20B according to another embodiment of the invention. As shown in FIG. 9, in some embodiments, a right-side vehicle bed support and stiffener 10B can be provided that includes a front support wall 12B, a rearwardly extending floor wall portion 11B, and a rearwardly extending side wall portion 13B. In this illustrative example, the walls 11B and 13B connect together along a joint line 10J. Additionally, in this example, one or more through holes 13BH can be provided in the wall portion 13B, and one or more through holes 11BH can be provided in the wall portion 11B. In some embodiments, the pair of vehicle bed support and stiffeners shown in FIG. 9 can be formed by molding. In alternative embodiments, the pair of vehicle bed support and stiffeners shown in FIG. 9 can be formed from plate members that are bent in a similar manner to that described above, with the portions 11B and 13B being welded together along the joint line 10J, or, in some embodiments, without the portions 11B and 13B being adhered or connected together. In various examples, the embodiment shown in FIG. 9 can include similar materials to that described above. Moreover, the sizes and dimensions of the components of the embodiment shown in FIG. 9 can be like that set forth above with respect to the embodiments shown in FIGS. 1-8.

As described herein, the present invention provides notable advantages over existing vehicle bed stiffeners.

Figure 10:
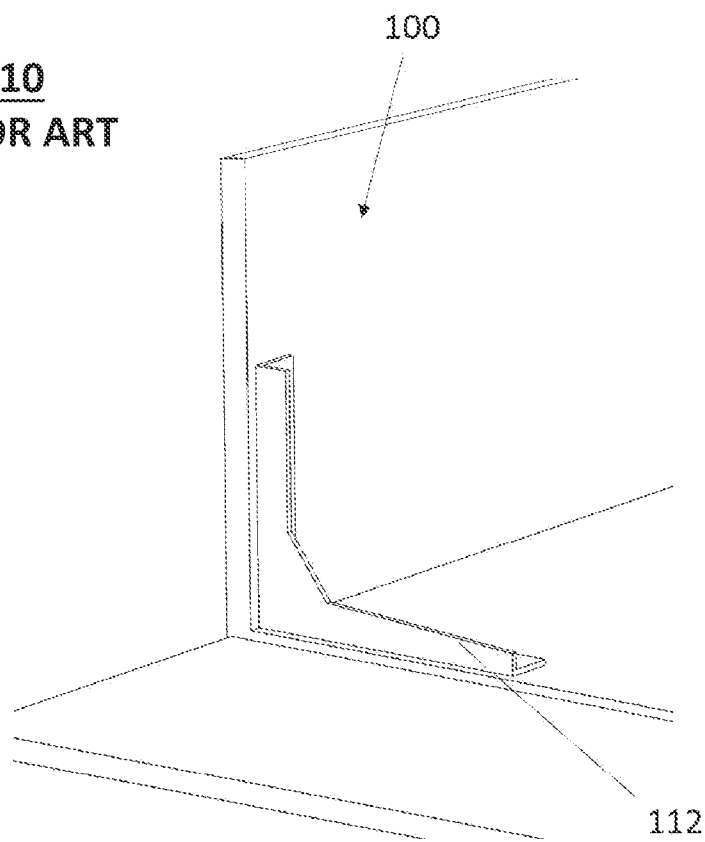
FIG. 10 is a perspective view of a background vehicle bed stiffener mounted in a vehicle bed such to protrude inwardly into the region of the vehicle bed both from the perimeter wall of the vehicle bed and from the floor of the vehicle bed.

First, as described herein, the vehicle bed support and stiffener assembly of the present invention highly advantageously provides desirable support and stiffening without obstruction of the vehicle bed. In contrast, as shown in FIG. 10, the plate 112 in the existing device directly encroaches and obstructs the region of the vehicle bed. As also described herein, the present invention advantageously does not encroach or obstruct the vehicle bed, which is desirable from a perspective of use of the vehicle bed, but is also desirable from the perspective of strength and longevity of the vehicle bed support and stiffener assembly. Notably, as the vehicle bed support and stiffener assembly can be advantageously mounted flush to the surfaces of the vehicle bed, the assembly is much less subject to impact or external stresses or strains during use.

Second, a vehicle bed support and stiffener assembly according to embodiments of the present invention has other structural advantages. For example, by extending the walls 12 and 22 outwardly (e.g., downwardly below the plane of the floor and laterally outward from the inside of the lateral side walls), the walls 12 and 22 can advantageously be subjected to tensile loads in the event that the perimeter walls of the vehicle bed are pressed inwardly (e.g., if the wall 101 in FIG. 7 is pressed inwardly or subjected to an inward force). In contrast, in the device shown in FIG. 10, such a force would place a compressive load on the wall 112. As another example, because the walls 12 and 22 can be rested flush against a rear wall of the vehicle bed (such as, e.g., shown in FIGS. 7 and 8), the walls 12 and 22 can receive some lateral support via contact with such rear wall of the vehicle bed. As a result, the vehicle bed support and stiffener assembly according to the embodiments described herein can have substantial desirability and improvement in some contexts.

The preferred embodiments described herein involve assemblies having two vehicle bed support and stiffeners, including one for the left-side and one for the right-side, as described above. However, in some alternative, although less preferred embodiments, a vehicle bed support and stiffener can include a single member that includes both the left-side and right-side members connected together so as to span across the entire vehicle bed. Moreover, in some alternative embodiments, rather than attaching vehicle bed supports and stiffeners at both left and right sides of the vehicle bed, a single support and stiffener can be attached at only one of the left or right sides of the vehicle bed.

Additionally, although the preferred embodiments of the present invention include vehicle bed support and stiffening members that include rearward walls 11, 21 that extend over and along the floor of the vehicle bed and rearward walls 13, 23 that extend along the perimeter side walls of the vehicle bed, in some less preferred embodiments, one or both of the walls 11, 21 and 13, 23 can be eliminated. In the even that a wall 11, 21 or 13, 23 is eliminated, the wall 12 would preferably be adapted with through holes or the like for receiving mounting bolts or the like for supporting the vehicle bed support and stiffening device.

Figure 11:
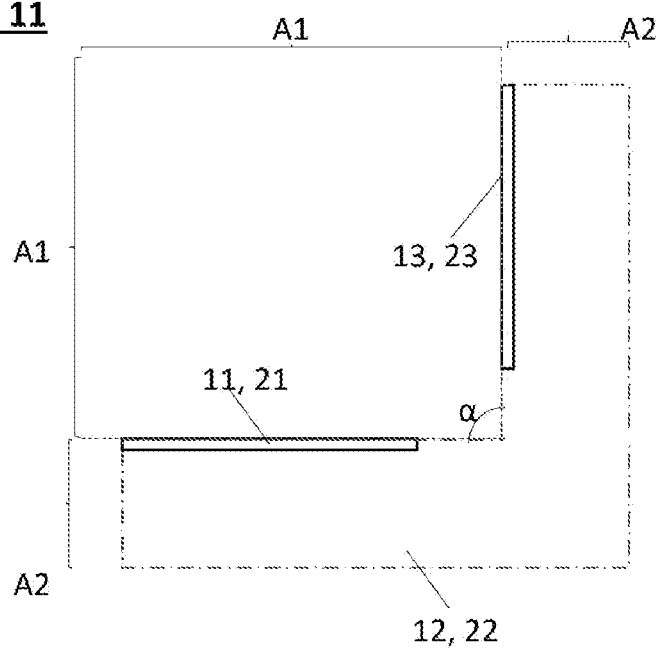
FIG. 11 is an explanatory schematic side view of a vehicle bed support or stiffener according to some embodiments.

As discussed herein-above, in the preferred embodiments, the vehicle bed support or stiffener can be provided that advantageously provides enhanced support or stiffening of a vehicle bed without obstructing or encroaching a vehicle bed. Towards this end, as shown schematically in FIG. 11, which is a schematic side view of a vehicle bed support or stiffener according to some embodiments herein, in the preferred embodiments the walls 11, 21 preferably extend flush along the floor of a vehicle bed while the walls 13, 23 preferably extend flush along a perimeter wall of the vehicle bed, such that the region A1 shown in FIG. 11 depicts a region within the vehicle bed. As shown in FIG. 11, the region A1 within the vehicle bed is also defined as a region within or internal to the angle $\alpha$. As also shown in FIG. 11, in the preferred embodiments, the walls 12, 22 are preferably located within the region 12, 22 shown in dashed lines in FIG. 11. This region shown in dashed lines also corresponds to the region A2, which is a region external to the vehicle bed, and external to the angle $\alpha$. Although in some embodiments, the walls 12, 22 could be made to extend partly within the region A1, in the preferred embodiments, the walls 12, 22 are substantially entirely or, more preferably, entirely outside of the region A1 and within the region A2 shown in FIG. 11.

Broad Scope of the Invention

While illustrative embodiments of the invention have been described herein, the present invention is not limited to the various preferred embodiments described herein, but includes any-and-all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example." The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. Additionally, the disclosure of ranges is intended as a continuous range including every value between the minimum and maximum values plus the broadening of the range afforded by the use of the term "about", "substantially", or "approximately." Thus, recitation of ranges of values herein are merely intended to serve as a shorthand method of referring individually to each separate value falling within the range, unless otherwise indicated herein, and each separate value is incorporated into the specification as if it were individually recited herein. It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A vehicle bed support or stiffener assembly, comprising:
   at least one vehicle bed support or stiffener having an upwardly extending front support or stiffening wall portion, a rearwardly extending floor-attaching wall portion for externally attaching to a floor of a vehicle bed, and a rearwardly extending perimeter-side-wall-attaching wall portion,
   wherein the rearwardly extending floor-attaching wall portion extends substantially along a first plane and the rearwardly extending perimeter-side-wall attaching portion extends substantially along a second plane, wherein said first plane and said second plane form an angle α that is between about 60 to 120 degrees, and
   wherein said upwardly extending front support or stiffening wall portion extends external to a region within the angle α such as to avoid obstruction of a vehicle bed region.

2. The vehicle bed support or stiffener assembly of claim 1, wherein:
   said upwardly extending front support or stiffening wall portion does not extend internally within a region of the angle α so as not to obstruct the vehicle bed region.

3. The vehicle bed support or stiffener assembly of claim 1, wherein:
   said at least one vehicle bed support or stiffener includes a right-side vehicle bed support or stiffener and a left-side vehicle bed support or stiffener.

4. The vehicle bed support or stiffener assembly of claim 1, wherein:
   said at least one vehicle bed support or stiffener is made of metal.

5. The vehicle bed support or stiffener assembly of claim 1, wherein:
   each of said at least one vehicle bed support or stiffener is made from a single bent sheet of metal.

6. The vehicle bed support or stiffener assembly of claim 1, wherein:
   said at least one vehicle bed support or stiffener is made of stainless steel.

7. The vehicle bed support or stiffener assembly of claim 1, wherein:
   each of said at least one vehicle bed support or stiffener has a height of between about 8 to 20 inches.

8. The vehicle bed support or stiffener assembly of claim 1, wherein:
   each of said at least one vehicle bed support or stiffener has a height of between about 10 to 18 inches.

9. The vehicle bed support or stiffener assembly of claim 1, wherein:
   each of said at least one vehicle bed support or stiffener is made with a metal plate having a thickness of between about 0.085 to 0.25 inches.

10. The vehicle bed support or stiffener assembly of claim 1, further including:
    a vehicle bed having a floor and left and right side walls extending upwardly at left and right sides of said floor;
    said at least one vehicle bed support or stiffener including a left-side vehicle bed support or stiffener and a right-side vehicle bed support or stiffener;
    wherein said upwardly extending front support or stiffening wall portion of each of said left-side vehicle bed support or stiffener and said right-side vehicle bed support or stiffener extends laterally outside of an end of said floor and laterally outside of an end of a respective one of said left and right side walls.

11. The vehicle bed support or stiffener assembly of claim 10, wherein said at least one vehicle bed support or stiffener extends flush along the floor to avoid obstruction over the vehicle bed.

12. The vehicle bed support or stiffener assembly of claim 10, wherein said at least one vehicle bed support or stiffener extends flush along at least one of said left and right side walls to avoid obstruction over the vehicle bed.

13. The vehicle bed support or stiffener assembly of claim 1, wherein the at least one vehicle bed support or stiffener extends inwardly from a perimeter side wall of the vehicle bed a distance of less than about ½ inch.

14. The vehicle bed support or stiffener assembly of claim 1, wherein the at least one vehicle bed support or stiffener extends inwardly from a perimeter side wall of the vehicle bed a distance of less than about ⅓ inch.

15. The vehicle bed support or stiffener assembly of claim 1, wherein the at least one vehicle bed support or stiffener extends inwardly from a perimeter side wall of the vehicle bed a distance of less than about ¼ inch.

16. The vehicle bed support or stiffener assembly of claim 1, wherein the at least one vehicle bed support or stiffener extends upwardly from a floor of the vehicle bed a distance of less than about ½ inch.

17. The vehicle bed support or stiffener assembly of claim 1, wherein the at least one vehicle bed support or stiffener extends upwardly from a floor of the vehicle bed a distance of less than about ⅓ inch.

18. The vehicle bed support or stiffener assembly of claim 1, wherein the at least one vehicle bed support or stiffener extends upwardly from a floor of the vehicle bed a distance of less than about ¼ inch.

19. A method of supporting or stiffening a vehicle bed, comprising:
   a) providing a vehicle having a vehicle bed with a floor and left and right side walls extending upwardly at left and right sides of said floor;
   b) providing a vehicle bed support or stiffener having an upwardly extending front support and stiffening wall portion;
   c) fixing the vehicle bed support or stiffener externally to the vehicle bed, with said upwardly extending front support and stiffening wall extending laterally along an end of said floor and downwardly below a plane of the floor and extending laterally along an end of one of said left and right side walls and outwardly away from the vehicle bed.

20. A method of using the vehicle bed support or stiffener assembly of claim 1, comprising:
   fixing the vehicle bed support or stiffener to a vehicle bed, with said upwardly extending front support and stiffening wall extending laterally along an end of said floor and downwardly below a plane of the floor and extending laterally along an end of one of said left and right side walls and outwardly away from the vehicle bed.

* * * * *